P. REECKE.
RETORT.
APPLICATION FILED OCT. 17, 1917.
1,358,327.
Patented Nov. 9, 1920.
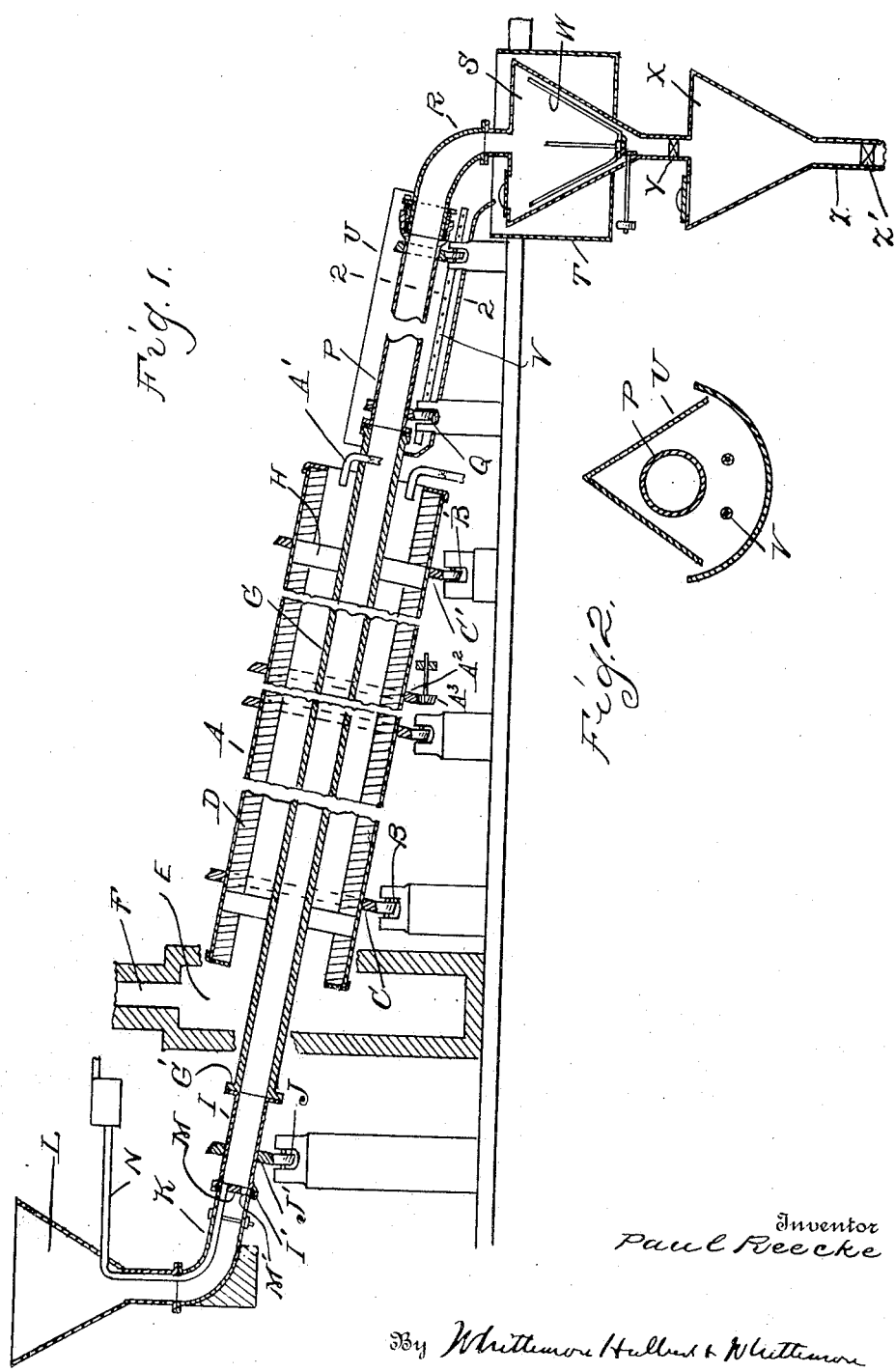

UNITED STATES PATENT OFFICE.

PAUL REECKE, OF WALLACEBURG, ONTARIO, CANADA.

RETORT.

1,358,327.  Specification of Letters Patent.  Patented Nov. 9, 1920.

Application filed October 17, 1917. Serial No. 197,071.

*To all whom it may concern:*

Be it known that I, PAUL REECKE, a subject of the Emperor of Germany, having taken out first United States citizenship papers, residing at Wallaceburg, in the Province of Ontario and Dominion of Canada, have invented certain new and useful Improvements in Retorts, of which the following is a specification, reference being had therein to the accompanying drawings.

The invention relates to retorts designed for use in the calcining or reduction of various substances, such for instance as barium carbonate. It is the object of the invention, first, to provide means for introducing and removing material from the retort while in continuous operation; second, to protect the calcined or reduced material from deterioration by expossure to the air while in a heated condition; and third, to obtain various features of advantage as hereinafter set forth.

In the drawings:

Figure 1 is a vertical central longitudinal section through the retort;

Fig. 2 is an enlarged cross section thereof on line 2—2 Fig. 1.

The usual method of reducing barium carbonate and the formation of barium oxid or barium hydrate is to heat in a stationary retort the carbonate mixed with a suitable quantity of carbonaceous material, such as pulverized coal. This will cause the reduction of the carbon dioxid to carbon monoxid, which will pass off as a gas, leaving the barium oxid as a resultant product. There is, however, great difficulty in maintaining the pure product, for the reason that while in a heated state the oxid has a strong affinity for carbon dioxid, and it is difficult or impossible to remove the charge from the retort without permitting a partial re-carburizing. Thus the instant that the retort is opened and free oxygen finds access to the heated mass, the incandescent carbon will combine therewith forming carbon dioxid, which in turn will combine with the barium oxid, forming again the barium carbonate. Similar reactions will take place with other substances, such as calcium and strontium.

With my improved apparatus the material to be treated is introduced into a rotary and inclined retort, so that during the heat treatment it is progressively fed downward. Furthermore, there is provided a cooling apparatus connected with the retort with a hermetically sealed joint, and the material fed into this cooler will be reduced in temperature to below the danger point before any exposure to the air.

In detail, A is a rotary drum arranged on an inclined axis and supported by suitable means, such as the roller bearings B B′ engaging annular rings C C′. This drum is provided with a refractory lining D and the lower end is open while the upper end is connected with a chamber E leading to a stack F or other means for producing the draft.

Supported centrally within the drum A is a cylindrical retort G, formed of material which will stand a relatively high degree of heat. The retort is supported by inwardly-projecting members H also formed of refractory material and arranged not to materially interfere with the draft through the drum. At the upper end the retort projects beyond the drum and through an opening in the wall of the chamber E, terminating in a flange G′ which is coupled to a metallic cylinder I. This cylinder is axially alined with the retort and cylinder A, and may be rotatively supported by a roller bearing J engaging the annular member J′. K is a non-revolving conduit alined with the cylinder I and engaging a flaring mouth I′ thereof so as to form a substantially airtight joint. The conduit K is connected with a hopper or other receptacle L, in which is placed the mixed coal and barium carbonate or other material to be treated. M is a gate in the conduit K which is apertured at M′ for the passage of the material therethrough and is also apertured for connection with a gas-escape pipe N.

At its lower end the retort is connected with a cylinder P which is rotatively supported upon the roller bearings Q and is attached to the retort so as to form an airtight joint. R is a non-rotating conduit alined with and connected to the cylinder P, and leading to a hopper-like receptacle S which is inclosed in a water-jacket T or other cooler. The cylinder P is also inclosed in a jacket U, and water spray pipes V are arranged within this jacket to direct streams of cooling water upon the cylinder during its rotation. W is a stirring device within the receptacle. X is a lower receptacle connected to the receptacle S with a shut-off valve Y therebetween and Z is a discharge conduit from the receptacle X controlled by the valve Z'.

In operation, the retort is headed by combustion within the cylinder A of any suitable fuel, such as gas, introduced through the burners A'. The direct impingement of the flame on the retort, as well as the heat reflected inward from the refractory lining D of the cylinder A, will raise the retort to a high temperature. At the same time rotary motion is imparted to the cylinder and retort through suitable means, such as the ring-gear $A^2$ and driving pinion $A^3$. Thus the mixture which is in the hopper L will be fed downward by gravity through the aperture M' in the gate M and into the rotating cylinder I, from which it will be progressively fed into the upper end of the retort G. The continued rotation will effect a gradual downward feeding of the material through the retort, and when it passes the zone of high heat it will be raised to a temperature where the coal or other carbonaceous material will reduce the carbonate, forming the oxid and liberating carbon monoxid. After passing the heated zone the material will be fed into the cylinder P, the walls of which are maintained at relatively low temperature by the constant play of the water jets V thereon. This will largely cool the product, but further cooling is effected when it is discharged into the receptacle S and is subjected to the action of the stirrer W. Finally the material is permitted to pass the valve Y into the receptacle X, and when completely cooled is discharged from said receptacle by the opening of the valve Z'. The effect of this treatment is to avoid carbureting any of the barium oxid, and as the latter is soluble may be readily leached out from the carbonaceous material with which it is commingled.

What I claim as my invention is:

1. An apparatus for reducing materials, comprising a rotary drum forming a furnace chamber, a retort arranged within said drum and rotating therewith, means for feeding material to be treated into one end of said retort and the reduced material out from the other end of said retort without exposure to the external air, a cooling receptacle connecting with the discharge end of said retort, a water-jacketed receptacle connecting with said cooling receptacle, and a stirring device within said water-jacketed receptacle.

2. An apparatus for reducing materials, comprising a drum forming a furnace chamber, a rotatable retort within said drum, means for feeding material to be treated into one end of said retort and the reduced material out from the other end of said retort without exposure to the external air, a cooling receptacle connecting with the discharge end of said retort, and means for stirring said reduced material fed into said cooling receptacle.

3. The combination with a rotary cylinder forming a furnace chamber, of a cylindrical retort extending longitudinally through said cylinder, said cylinder and retort being arranged on an inclined axis, a conduit having air-tight connection with the upper end of said retort for introducing the material to be treated thereinto, a rotary cooling cylinder connected to the lower end of said retort, means at one side of said cooling cylinder for directing a cooling fluid thereupon, and means connected to said cooling cylinder for receiving the material discharged therefrom without exposure to the air.

4. The combination with a rotary cylinder forming a furnace chamber, of a cylindrical retort extending longitudinally through said cylinder, said cylinder and retort being arranged on an inclined axis, a conduit having an air-tight connection with the upper end of said retort for introducing the material to be treated thereinto, an apertured gate between said conduit and retort for allowing the material to pass from the conduit into the retort, and a gas-escape conduit extending within said conduit and engaging in an aperture in said gate.

In testimony whereof I affix my signature.

PAUL REECKE.